(12) United States Patent
Kielkowski (10) Patent No.: US 12,381,597 B2
(45) Date of Patent: Aug. 5, 2025

(54) ALTERNATIVE NEAR FIELD COMMUNICATION SYSTEM FOR HVAC EQUIPMENT

(71) Applicant: Carrier Corporation, Palm Beach Gardens, FL (US)

(72) Inventor: Ron Kielkowski, Indianapolis, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 367 days.

(21) Appl. No.: 17/959,604

(22) Filed: Oct. 4, 2022

(65) Prior Publication Data

US 2023/0108616 A1    Apr. 6, 2023

Related U.S. Application Data (60) Provisional application No. 63/252,439, filed on Oct. 5, 2021.

(51) Int. Cl.
*H04B 5/72* (2024.01)
*H04B 5/75* (2024.01)

(52) U.S. Cl.
CPC ............ *H04B 5/72* (2024.01); *H04B 5/75* (2024.01)

(58) Field of Classification Search
CPC ... H04B 5/72; H04B 5/75; H04B 5/45; H04B 5/20; Y02B 30/70; F24F 1/22; F24F 11/56
See application file for complete search history.

(56) References Cited

U.S. PATENT DOCUMENTS

| | | | |
|---|---|---|---|
| 9,602,163 B2 | 3/2017 | Schultz et al. | |
| 9,872,126 B2 | 1/2018 | Yarde et al. | |
| 10,006,654 B2 * | 6/2018 | Shaull | H04W 4/80 |
| 10,132,508 B2 | 11/2018 | Frilev et al. | |
| 10,261,530 B2 | 4/2019 | Schmidlin et al. | |
| 10,291,292 B2 | 5/2019 | Rumler et al. | |
| 10,330,337 B2 * | 6/2019 | Inada | F24F 11/38 |
| 10,373,036 B2 | 8/2019 | Yamamoto et al. | |
| 10,859,285 B2 | 12/2020 | Grogg et al. | |
| 11,018,720 B2 | 5/2021 | Rumler et al. | |
| 2019/0123575 A1 * | 4/2019 | Cha | H02J 50/80 |

(Continued)

FOREIGN PATENT DOCUMENTS

| | | |
|---|---|---|
| CN | 203671833 U | 6/2014 |
| CN | 104283991 A | 1/2015 |
| CN | 104006496 B | 3/2017 |

(Continued)

OTHER PUBLICATIONS

European Search Report for Application No. 22199195.3; Issued Feb. 2, 2023; 7 Pages.

*Primary Examiner* — Ankur Jain
(74) *Attorney, Agent, or Firm* — CANTOR COLBURN LLP (57) ABSTRACT

A near field communication device for a heat, ventilation, and air conditioning (HVAC) system including: a near field radio antenna configured to detect and transmit near field communication wireless signals, wherein the near field radio antenna is configured to be attached to a housing of an outdoor unit of the HVAC system; a near field transceiver configured to communicate with a mobile device through the near field radio antenna; and a controller configured to be in electronic communication with an outdoor controller of the outdoor unit.

18 Claims, 3 Drawing Sheets

(56) References Cited

U.S. PATENT DOCUMENTS

2020/0064002 A1 2/2020 Bogli et al.

FOREIGN PATENT DOCUMENTS

| CN | 111503834 | A  | 8/2020 |
|----|-----------|----|--------|
| CN | 109479017 | B  | 7/2021 |
| EP | 3222927   | A1 | 9/2017 |
| JP | 6473651   | B2 | 2/2019 |
| JP | 6476100   | B2 | 2/2019 |
| JP | 2020134019| A  | 8/2020 |
| WO | 2017030237| A1 | 2/2017 |

\* cited by examiner

ALTERNATIVE NEAR FIELD COMMUNICATION SYSTEM FOR HVAC EQUIPMENT

CROSS-REFERENCE TO RELATED APPLICATIONS

This application claims the benefit of U.S. Provisional Application No. 63/252,439 filed Oct. 5, 2021, the disclosure of which is incorporated herein by reference in its entirety.

BACKGROUND

The embodiments herein generally relate to a heating, ventilation, and air conditioning (HVAC) system and more specifically to a system and method for wireless communication between a mobile device and an HVAC system.

HVAC is the technology of indoor and vehicular environmental comfort and is an important part of residential, industrial and commercial structures. The heating process in HVAC systems provides for increases in indoor temperatures while the air conditioning process provides for decreases in indoor temperatures. The ventilation processes involves exchanges or replacements of air in a space to thus provide for high indoor air quality with temperature control, oxygen replenishment and removal of moisture, odors, smoke, heat, dust, airborne bacteria, carbon dioxide and other gases. Ventilation includes both the exchange of indoor and outdoor air as well as the circulation of air within a building.

Home-based HVAC systems typically include an outdoor unit, an indoor unit, a thermostat and one or more sensors in some cases. The thermostat is usually accessible to the homeowner who uses the thermostat to set a desired temperature for an indoor space in a home. The thermostat then operates the outdoor and indoor units so as to achieve that desired temperature in a manner that also reduces costs and energy usage as much as possible. To this end, if the temperature in the indoor space is lower than the desired temperature by a predetermined degree, the thermostat will command the outdoor and indoor units to pump heated air into the indoor space so as to raise the temperature of the indoor space beyond the desired temperature by a predetermined degree. On the other hand, if the temperature in the indoor space is higher than the desired temperature by a predetermined degree, the thermostat will command the outdoor and indoor units to pump cool air into the indoor space so as to lower the temperature of the indoor space beyond the desired temperature by a predetermined degree.

BRIEF DESCRIPTION

According to one embodiment, a near field communication device for a heat, ventilation, and air conditioning (HVAC) system is provided. The near field communication device including: a near field radio antenna configured to detect and transmit near field communication wireless signals, wherein the near field radio antenna is configured to be attached to a housing of an outdoor unit of the HVAC system; a near field transceiver configured to communicate with a mobile device through the near field radio antenna; and a controller configured to be in electronic communication with an outdoor controller of the outdoor unit.

In addition to one or more of the features described above, or as an alternative, further embodiments of the transport refrigeration system may include a communication cable configured to connect the near field communication device to the outdoor controller, wherein the controller is in electronic communication with the outdoor controller through the communication cable.

In addition to one or more of the features described above, or as an alternative, further embodiments of the transport refrigeration system may include that the near field radio antenna is configured to be attached to or located proximate to an inner surface of the housing of the outdoor unit or an outer surface of the housing of the outdoor unit.

In addition to one or more of the features described above, or as an alternative, further embodiments of the transport refrigeration system may include a mobile device cradle configured to be attached to the housing of the outdoor unit, the mobile device cradle being configured to support the mobile device, wherein the near field radio antenna is embedded in or attached to the mobile device cradle.

In addition to one or more of the features described above, or as an alternative, further embodiments of the transport refrigeration system may include that the mobile device cradle configured to be attached to an outer surface of the housing.

In addition to one or more of the features described above, or as an alternative, further embodiments of the transport refrigeration system may include that the mobile device cradle further includes a support surface where the mobile device may be placed on to wirelessly connect to the near field radio antenna.

In addition to one or more of the features described above, or as an alternative, further embodiments of the transport refrigeration system may include that the near field radio antenna is embedded in the support surface.

In addition to one or more of the features described above, or as an alternative, further embodiments of the transport refrigeration system may include that the mobile device cradle further includes at least one of: a first side guard extending away from the support surface, the first side guard being configured to prevent the mobile device from sliding laterally off the support surface; a second side guard extending away from the support surface and located opposite the first side guard, the second side guard being configured to prevent the mobile device from sliding laterally off the support surface; and a bottom guard extending away from the support surface, the bottom guard being configured to prevent the mobile device from sliding vertically off the support surface.

According to another embodiment, a near field communication system for wireless connection between a mobile device and a heat, ventilation, and air conditioning (HVAC) system is provided. The system including: an HVAC system including an outdoor unit including: an outdoor controller: and a housing having an inner surface and an outer surface; and a near field communication device including: a near field radio antenna configured to detect and transmit near field communication wireless signals, wherein the near field radio antenna is attached to the housing of the outdoor unit of the HVAC system; a near field transceiver configured to communicate with the mobile device through the near field radio antenna; and a controller configured to be in electronic communication with the outdoor controller of the outdoor unit.

In addition to one or more of the features described above, or as an alternative, further embodiments of the transport refrigeration system may include a communication cable configured to connect the near field communication device to the outdoor controller, wherein the controller is in electronic communication with the outdoor controller through the communication cable.

In addition to one or more of the features described above, or as an alternative, further embodiments of the transport refrigeration system may include that the near field radio antenna is attached to the inner surface of the housing of the outdoor unit.

In addition to one or more of the features described above, or as an alternative, further embodiments of the transport refrigeration system may include that the near field radio antenna is located proximate to the inner surface of the housing of the outdoor unit.

In addition to one or more of the features described above, or as an alternative, further embodiments of the transport refrigeration system may include that the near field radio antenna is attached to the outer surface of the housing of the outdoor unit.

In addition to one or more of the features described above, or as an alternative, further embodiments of the transport refrigeration system may include that the near field radio antenna is located proximate to the outer surface of the housing of the outdoor unit.

In addition to one or more of the features described above, or as an alternative, further embodiments of the transport refrigeration system may include that the near field communication device further includes: a mobile device cradle configured to be attached to the housing of the outdoor unit, the mobile device cradle being configured to support the mobile device, wherein the near field radio antenna is embedded in or attached to the mobile device cradle.

In addition to one or more of the features described above, or as an alternative, further embodiments of the transport refrigeration system may include that the mobile device cradle is attached to the outer surface of the housing.

In addition to one or more of the features described above, or as an alternative, further embodiments of the transport refrigeration system may include that the mobile device cradle further includes a support surface where the mobile device may be placed on to wirelessly connect to the near field radio antenna.

In addition to one or more of the features described above, or as an alternative, further embodiments of the transport refrigeration system may include that the near field radio antenna is embedded in the support surface.

In addition to one or more of the features described above, or as an alternative, further embodiments of the transport refrigeration system may include that the mobile device cradle further includes at least one of: a first side guard extending away from the support surface, the first side guard being configured to prevent the mobile device from sliding laterally off the support surface; a second side guard extending away from the support surface and located opposite the first side guard, the second side guard being configured to prevent the mobile device from sliding laterally off the support surface; and a bottom guard extending away from the support surface, the bottom guard being configured to prevent the mobile device from sliding vertically off the support surface.

In addition to one or more of the features described above, or as an alternative, further embodiments of the transport refrigeration system may include that the housing includes a marking to indicate where a user should place or locate their mobile device on the outer surface of the housing.

Technical effects of embodiments of the present disclosure include placing a near field radio antenna in an area of the easily accessible to a mechanic such that a mechanic may easily connect to the HVAC system through near field communication.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As will be described below, a heating, ventilation and air-conditioning (HVAC) system for a structure is provided. The HVAC system may include an outdoor unit disposed at an exterior of the structure and an indoor unit disposed at an interior of the structure. Various operations of the outdoor and indoor units are controllable to maintain desired environmental conditions in the interior of the structure using a thermostat in wireless communication with one or more sensors spread throughout the structure. Embodiments disclosed herein seek to provide a short range wireless communication method and system for a mobile device to communicate with the outdoor unit.

Figure 1:
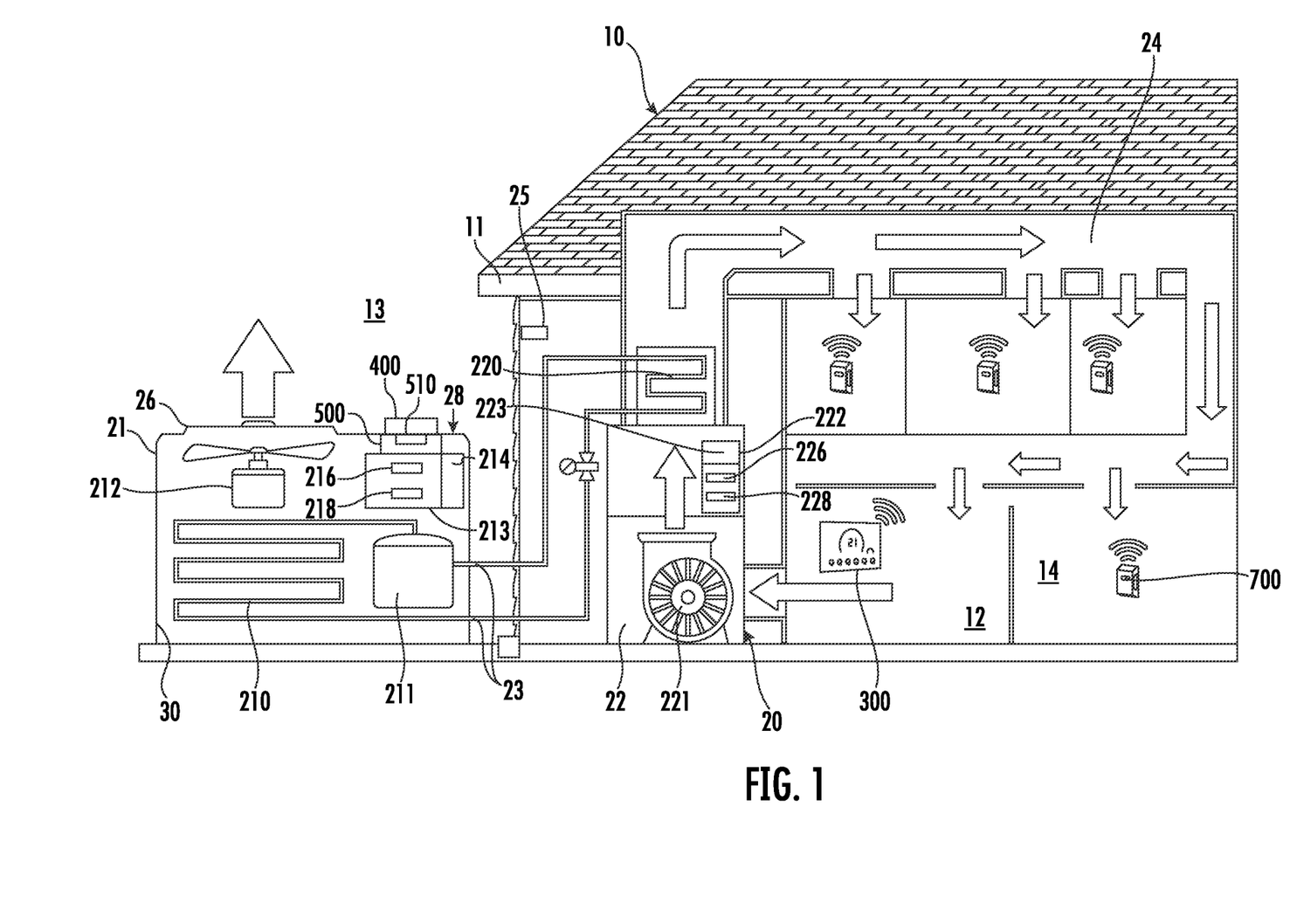
FIG. 1 is a perspective view of a structure in which a heating, ventilation and air-conditioning (HVAC) system is deployed, according to an embodiment of the present disclosure.

FIG. 1 is schematic view of a structure 10 and an HVAC system 20 for the structure 10, according to an embodiment of the present disclosure. The structure 10 may be configured as a residence, an industrial building, or a commercial building. For purposes of clarity and brevity, however, the following description will relate to the case where the structure 10 is configured as a single-family residence. The structure 10 thus includes a structural body 11 which defines an interior 12 and separates the interior 12 from an exterior 13. The interior 12 may be further divided into multiple rooms 14 and areas for various purposes.

The structure 10 includes an HVAC system 20 disposed and configured to control environmental conditions within the interior 12. The HVAC system 20 includes one or more of an outdoor unit 21 and an indoor unit 22. The outdoor unit 21 is disposed at the exterior 13 of the structural body 11 and the indoor unit 22 is disposed in the interior 12.

As shown in FIG. 1, the outdoor unit 21 includes a condenser coil 210, a compressor 211, a fan 212 and, in some cases, an outdoor controller 213, and a first wireless transceiver 214. The first wireless transceiver 214 may be in wireless communication with a thermostat 300. Alternatively, the outdoor unit 21 may be in wired communication with the thermostat 300. The outdoor controller 213 may be an electronic controller including a processor 216 and an associated memory 218 comprising computer-executable instructions (i.e., computer program product) that, when executed by the processor 216, cause the processor 216 to perform various operations. The processor 216 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 218 may be but is not limited to a random access memory (RAM), read only memory (ROM), or other electronic, optical, magnetic or any other computer readable medium.

As shown in FIG. 1, the indoor unit 22 includes an indoor coil 220, a furnace 221 and, in some cases, an indoor controller 222 and a second wireless transceiver 223. The second wireless transceiver 223 may be in wireless communication with a thermostat 300. Alternatively, the indoor unit 22 may be in wired communication with the thermostat 300. The second wireless transceiver 223 may also be in wireless communication with the first wireless transceiver 214. The indoor controller 222 may be an electronic controller including a processor 226 and an associated memory 228 comprising computer-executable instructions (i.e., computer program product) that, when executed by the processor 226, cause the processor 226 to perform various operations. The processor 226 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 228 may be but is not limited to a random access memory (RAM), read only memory (ROM), or other electronic, optical, magnetic or any other computer readable medium.

Refrigeration lines 23 are provided to connect the outdoor unit 21 with the indoor unit 22 and ducts 24 are provided throughout the interior 12 such that heated or cooled air can be transported from the indoor unit 22 to the various areas in the interior 12. It is understood that while FIG. 1 illustrated a particular arrangement of ducts 24, the embodiments disclosed herein may apply to any arrangement of ducts 24.

In some cases, the components of the outdoor unit 21 and the indoor unit 22 may be included in a single unit that can be disposed at the exterior 13 of the structural body 11 or in the interior 12. For example, the components of the indoor unit 22 may be included in the outdoor unit 21 and disposed at the exterior 13. Conversely, the components of the outdoor unit 21 may be included in the indoor unit 22 and disposed in the interior 12. Still other embodiments exist in which the components of the outdoor unit 21 and indoor unit 22 are included in a single device which is partially disposed at the exterior 13 and partially disposed in the interior 12 (e.g., a window air-conditioning unit or wall air conditioning unit).

The HVAC system 20 may further include one or more sensors 700, such as temperature sensors, that are distributed throughout the interior 12 and possibly at the exterior 13. The sensors 700 are in wireless or wired communication with the thermostat 300, a further discussed herein. The thermostat 300 is generally accessible to an individual and is configured to control various operations of the outdoor unit 21 and indoor unit 22 to maintain desired environmental conditions in the interior 12 in accordance with at least readings of the one or more sensors 700 and with commands input by a user.

The thermostat 300 may have the capability to establish and maintain wireless connectivity over one or more networks (e.g., Wi-Fi, Bluetooth, Z-Wave, Zigbee, etc.). The thermostat 300 can therefore be connected to a homeowner's Wi-Fi network and the Internet. This allows the thermostat 300 to have additional features and capabilities including, but not limited to, being remotely controllable by a user using a portable computing device (e.g., a mobile phone, a tablet, a laptop, etc.).

The HVAC system 20 may further include a near field communication device 500 in wired or wireless communication with the outdoor controller 213. The near field communication device 500 includes a near field radio antenna configured to communicate with a mobile device 400 using near field communication. The outdoor unit 21 includes a housing 26 that houses or contains the outdoor unit 21. The housing 26 protects the outdoor unit 21 from the outside environment. The housing 26 may include an outer surface 28 and an inner surface 30.

Typically, in order to communicate with a near field device such as near field device 500, the communicating device must be in close proximity to the near field device. In an HVAC system a user such as a mechanic typically may remove a housing 26 and in some circumstances remove other components in order to place a communications device in close proximity to the near field device 500. In order to allow a user to communicate with the near field device 500 without removing the housing 26 and/or other components, the near field radio antenna 520 (shown in FIG. 2) may be located within a housing 26 of the outdoor unit 21 attached to or proximate to an inner surface 30 of the housing 26, such that near field communications may be transmitted between the near field radio antenna 520 and the mobile device 400 through the housing 26. Alternatively, the near field radio antenna 520 may be located outside of the housing 26 attached to or proximate to an outer surface 28 of the housing 26.

Figure 2:
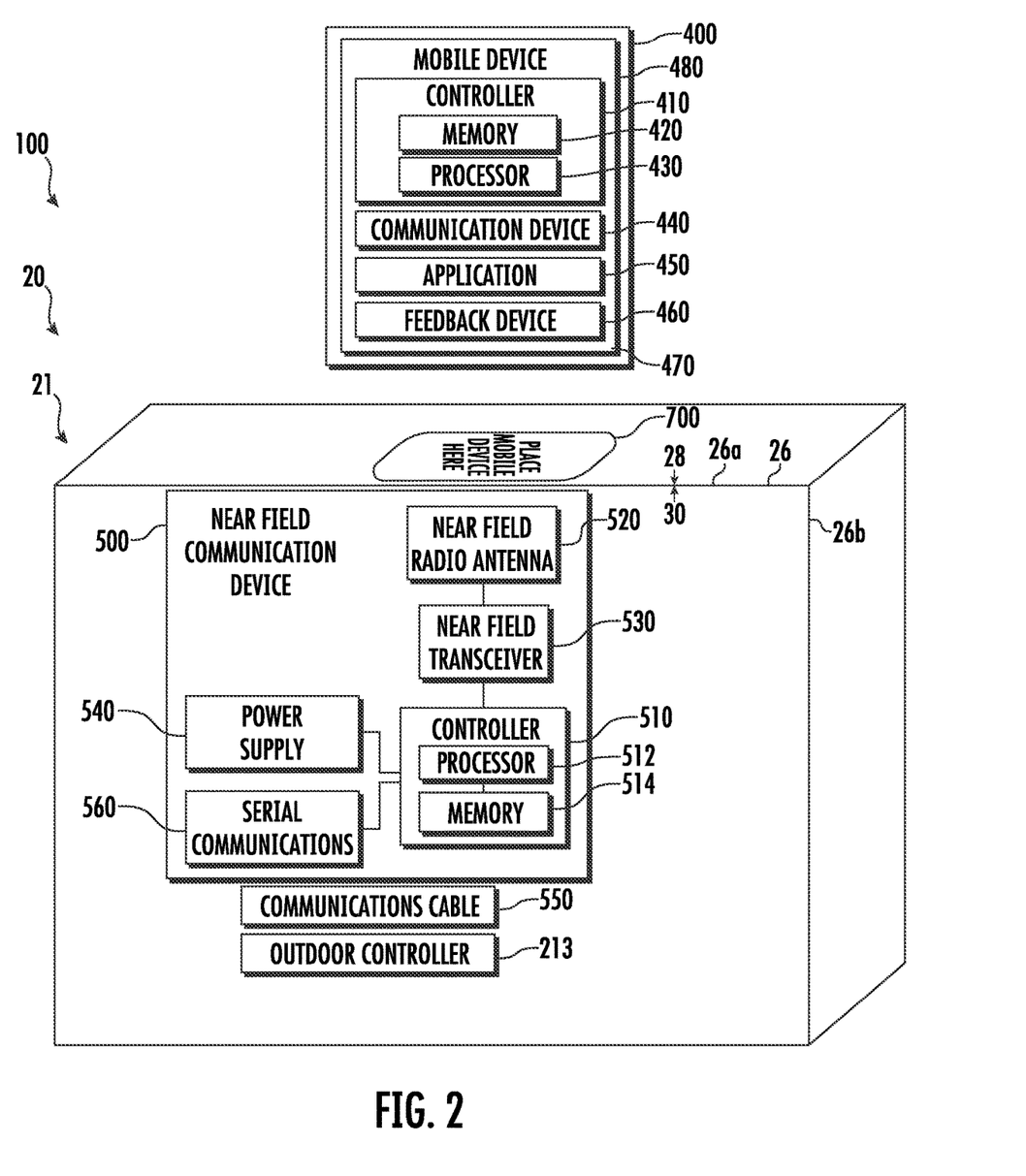
FIG. 2 is a block diagram of a near field communication system for wireless connection between a mobile device and the HVAC system, according to an embodiment of the present disclosure.

Referring now to FIG. 2, with continued reference to FIG. 1, a block diagram of a near field communication system 100 for wireless connection between the mobile device 400 and the HVAC system 20 is illustrated, according to an embodiment of the present disclosure. It should be appreciated that, although particular systems are separately defined in the schematic block diagrams, each or any of the systems may be otherwise combined or separated via hardware and/or software.

The near field communication device 500 includes a controller 510, a near field radio antenna 520, a near field transceiver 530, a processor 512, a memory 514, a communication cable 550 and a power supply 540.

The near field radio antenna 520 is configured to detect and transmit near field communication wireless signals. A near field transceiver 530 is configured to communicate with a mobile device 400 through the near field radio antenna 520. The near field transceiver 530 is configured to transmit and receive data through the near field radio antenna 520 to and from a communication device 440 of the mobile device 400. The near field transceiver 530 may be capable of wireless communication including but not limitation to a near field communication (i.e., NFC), or another short-range wireless transmission method. The near field radio antenna 520 is any antenna appropriate to the near field transceiver 530. The power supply 540 is a power source such as a power cable, a power scavenging system, power generation system, or a battery that powers the near field communication device 500.

The controller 510 may be an electronic controller including a processor 512 and an associated memory 514 comprising computer-executable instructions (i.e., computer program product) that, when executed by the processor 512, cause the processor 512 to perform various operations. The processor 512 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 514 may be but is not limited to a random access memory (RAM), read only memory (ROM), or other electronic, optical, magnetic or any other computer readable medium.

The controller 510 is configured to be in electronic communication with the outdoor controller 213. The controller 510 may in wired or wireless communications with the outdoor controller 213.

The communication cable 550 may be a hardline cable that is configured to connect the near field communication device 500 to the outdoor controller 213 so that the near field communication device 500 may communicate with the outdoor controller 213. The outdoor controller 213 is configured to communicate with the mobile device 400 through the near field communication device 500 and the mobile device 400 is configured to communicate with the outdoor controller 213 through the near field communication device 500. The near field communication device 500 may include serial communications 560, which may be the communication standards for communications with the mobile device 400 and the outdoor controller 231.

The mobile device 400 may be a mobile computing device that is typically carried by a person, such as, for example a phone, a smart phone, a PDA, a smart watch, a tablet, a laptop, or any other mobile computing device known to one of skill in the art. The mobile device 400 includes a controller 410 configured to control operations of the mobile device 400. The controller 410 may be an electronic controller including a processor 430 and an associated memory 420 comprising computer-executable instructions (i.e., computer program product) that, when executed by the processor 430, cause the processor 430 to perform various operations. The processor 430 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 420 may be but is not limited to a random access memory (RAM), read only memory (ROM), or other electronic, optical, magnetic or any other computer readable medium.

The mobile device 400 includes a communication device 440 configured to communicate with the near field radio antenna 520 through one or more wireless signals. The one or more wireless signals may be near field communications or any other short range wireless communication known to one of skill in the art. The mobile device 400 is configured to communicate with the outdoor controller 213 through the near field communication device 500.

The mobile device 400 may include a display device 480, such as for example a computer display, an LCD display, an LED display, an OLED display, a touchscreen of a smart phone, or any other similar display device known to one of the skill in the art. A user operating the mobile device 400 is able to view an application 450 through the display device 480.

The application 450 may allow the user to program the HVAC system 20, communicate with the HVAC system 20, update firmware of the HVAC system 20, view operational data of the HVAC system 20, and/or send commands to the HVAC system 20.

The mobile device 400 includes an input device 470 configured to receive a manual input from a user (e.g., human being) of mobile device 400. The input device 470 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the mobile device 400, or any similar input device known to one of skill in the art. The user operating the mobile device 400 is able to enter feedback into the application 450 through the input device 470. The input device 470 allows the user operating the mobile device 400 to enter feedback into the application 450 via a manual input to input device 470. For example, the user may respond to a prompt on the display device 480 by entering a manual input via the input device 470. In one example, the manual input may be a touch on the touchscreen. In an embodiment, the display device 480 and the input device 470 may be combined into a single device, such as, for example, a touchscreen.

The user may be able to view operational data of the HVAC system 20 through the display device 480 of the mobile device 400 when the mobile device 400 is in communication with the outdoor controller 213 through the near field communication device 500. The user may be able to troubleshoot the HVAC system 20 and send commands to the HVAC system 20 through the input device 470 of the mobile device 400 when the mobile device 400 is in communication with the outdoor controller 213 through the near field communication device 500.

The mobile device 400 device may also include a feedback device 460. The feedback device 460 may activate in response to a manual input via the input device 470. The feedback device 460 may be a haptic feedback vibration device and/or a speaker emitting a sound. The feedback device 460 device may activate to confirm that the manual input entered via the input device 470 was received via the application 450. For example, the feedback device 460 device may activate by emitting an audible sound or vibrate the mobile device 400 to confirm that the manual input entered via the input device 470 was received via the application 450.

As aforementioned and illustrated in FIG. 2, the near field radio antenna 520 may be located within a housing 26 of the outdoor unit 21 attached to or proximate to an inner surface 30 of the housing 26, such that near field communications may be transmitted between the near field radio antenna 520 and the mobile device 400 through the housing 26. The housing 26 includes a top wall 26a and one or more side wall 26b. The near field radio antenna 520 may be located within a housing 26 of the outdoor unit 21 attached to or proximate to the top wall 26a or the side wall 26b.

The mobile device 400 may need to be laid flat on the outer surface 28 of the housing 26 in order for the communication device 440 of the mobile device 400 to connect through near field communication with the near field radio antenna 520. The outer surface 28 of the housing 26 may include a marking 700 to indicate where a user should place or locate their mobile device 400 on the outer surface 28. The marking 700 may be an emblem, logo, symbol, text, pictograph, pictograph, ideogram, or any similar marking. The marking 700 may be attached the housing 26 (e.g., sticker or decal on the outer surface 28), etched into the housing 26, printed onto the outer surface 28 of the housing 26, embedded into the housing 26, embossed into the housing 26, stamped into the housing 26, or applied to the housing 26 using any other method known to one of skill in the art.

Figure 3:
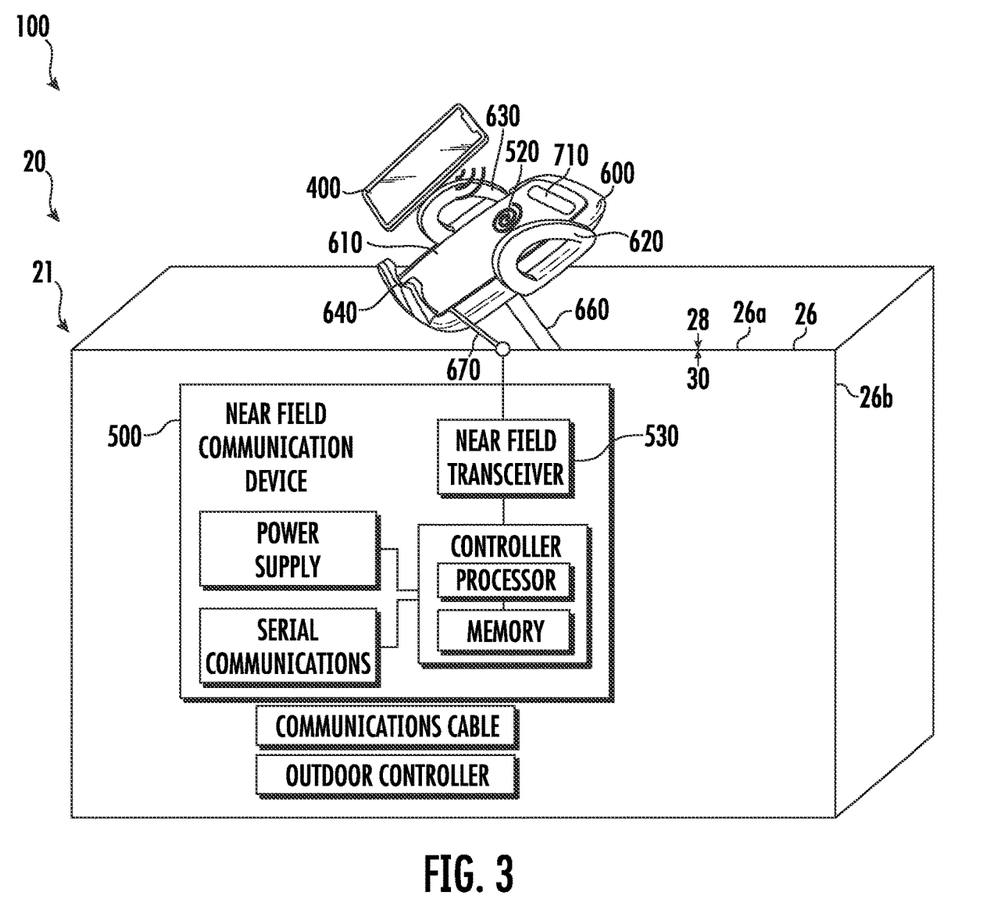
FIG. 3 is a block diagram of a near field communication system for wireless connection between a mobile device and the HVAC system, according to an embodiment of the present disclosure.

Referring now to FIG. 3, with continued reference to FIGS. 1-2, a block diagram of a near field communication system 100 for wireless connection between the mobile device 400 and the near field communication device 500 is illustrated, according to an embodiment of the present disclosure. It should be appreciated that, although particular systems are separately defined in the schematic block diagrams, each or any of the systems may be otherwise combined or separated via hardware and/or software.

FIG. 3 illustrates an alternative embodiment, where the near field radio antenna 520 may be located outside of the housing 26 attached to or proximate to an outer surface 28 of the housing 26. The near field radio antenna 520 is embedded in or attached to a mobile device cradle 600 that is configured to support the mobile device 400.

The mobile device cradle 600 is configured to support or hold a mobile device 400. The mobile device cradle 600 includes a support surface 610 where the mobile device 400 may be placed on to wirelessly connect to the near field radio antenna 520. The near field radio antenna 520 may be embedded in the support surface 610.

The support surface 610 may include a marking 710 to indicate where a user should place or locate their mobile device 400 on the support surface 610. The marking 710 may be an emblem, logo, symbol, text, pictograph, pictograph, ideogram, or any similar marking. The marking 710 may be attached the housing 26 (e.g., sticker or decal on the support surface 610), etched into the support surface 610, printed onto the support surface 610, embedded into the support surface 610, embossed into the support surface 610, stamped into the support surface 610, or applied to the support surface 610 using any other method known to one of skill in the art.

The mobile device cradle 600 may include a first side guard 620 and a second side guard 630 located opposite the first side guard 620. The first side guard 620 and second side guard 630 are configured to prevent the mobile device 400 from sliding laterally off the support surface 610. The first side guard 620 and the second side guard 630 extend away from the support surface 610. The mobile device cradle 600 may also include one or more bottom guards 640 configured to prevent the mobile device 400 from sliding vertically off the support surface 610. The one or more bottom guards 640 extend away from the support surface 610.

The mobile device cradle 600 is configured to attach to the housing 26. The mobile device cradle 600 may be configured to attach to the outer surface 28 of the housing 26 or the inner surface 30 of the housing 26. The mobile device cradle 600 may be configured to attach to the top wall 26a or the side wall 26b.

The mobile device cradle 600 may be attached directly to the housing 26 or through a support structure 660. The near field radio antenna 520 is connected to the near field transceiver 530 through a wired connection 670.

The mobile device cradle 600 may be composed of a weatherproof polyimide or a similar material known to one of skill in the art. Advantageously, the mobile device cradle 600 provides an easily accessible and clearly visible spot for a mechanic/user to place their phone and connect to the HVAC system 20 in order to run diagnostics, troubleshoot, program, update firmware, and/or communicate with the HVAC system 20.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A near field communication device for a heat, ventilation, and air conditioning (HVAC) system, the near field communication device comprising:
   a near field radio antenna configured to detect and transmit near field communication wireless signals, wherein the near field radio antenna is configured to be attached to a housing of an outdoor unit of the HVAC system;
   a near field transceiver configured to communicate with a mobile device through the near field radio antenna; and
   a controller configured to be in electronic communication with an outdoor controller of the outdoor unit;
   a mobile device cradle configured to be attached to the housing of the outdoor unit, the mobile device cradle being configured to support the mobile device,
   wherein the near field radio antenna is embedded in the mobile device cradle.

2. The near field communication device of claim 1, further comprising:
   a communication cable configured to connect the near field communication device to the outdoor controller, wherein the controller is in electronic communication with the outdoor controller through the communication cable.

3. The near field communication device of claim 1, wherein the near field radio antenna is configured to be attached to or located proximate to an inner surface of the housing of the outdoor unit or an outer surface of the housing of the outdoor unit.

4. The near field communication device of claim 1, wherein the mobile device cradle configured to be attached to an outer surface of the housing.

5. The near field communication device of claim 1, wherein the mobile device cradle further comprises a support surface where the mobile device may be placed on to wirelessly connect to the near field radio antenna.

6. The near field communication device of claim 5, wherein the near field radio antenna is embedded in the support surface.

7. The near field communication device of claim 5, wherein the mobile device cradle further comprises at least one of:
   a first side guard extending away from the support surface, the first side guard being configured to prevent the mobile device from sliding laterally off the support surface;
   a second side guard extending away from the support surface and located opposite the first side guard, the second side guard being configured to prevent the mobile device from sliding laterally off the support surface; and
   a bottom guard extending away from the support surface, the bottom guard being configured to prevent the mobile device from sliding vertically off the support surface.

8. A near field communication system for wireless connection between a mobile device and a heat, ventilation, and air conditioning (HVAC) system, the system comprising:
   an HVAC system comprising an outdoor unit comprising:
      an outdoor controller: and
      a housing having an inner surface and an outer surface; and
   a near field communication device comprising:
      a near field radio antenna configured to detect and transmit near field communication wireless signals, wherein the near field radio antenna is attached to the housing of the outdoor unit of the HVAC system;
      a near field transceiver configured to communicate with the mobile device through the near field radio antenna; and
      a controller configured to be in electronic communication with the outdoor controller of the outdoor unit;
   where the near field communication device further comprises:
      a mobile device cradle configured to be attached to the housing of the outdoor unit, the mobile device cradle being configured to support the mobile device,
      wherein the near field radio antenna is embedded in or attached to the mobile device cradle.

9. The near field communication system of claim 8, further comprising:
   a communication cable configured to connect the near field communication device to the outdoor controller, wherein the controller is in electronic communication with the outdoor controller through the communication cable.

10. The near field communication system of claim 8, wherein the near field radio antenna is attached to the inner surface of the housing of the outdoor unit.

11. The near field communication system of claim 8, wherein the near field radio antenna is located proximate to the inner surface of the housing of the outdoor unit.

12. The near field communication system of claim 8, wherein the near field radio antenna is attached to the outer surface of the housing of the outdoor unit.

13. The near field communication system of claim 8, wherein the near field radio antenna is located proximate to the outer surface of the housing of the outdoor unit.

14. The near field communication system of claim 8, wherein the mobile device cradle is attached to the outer surface of the housing.

15. The near field communication system of claim 8, wherein the mobile device cradle further comprises a support surface where the mobile device may be placed on to wirelessly connect to the near field radio antenna.

16. The near field communication system of claim 8, wherein the near field radio antenna is embedded in the support surface.

17. The near field communication system of claim 8, wherein the mobile device cradle further comprises at least one of:
   a first side guard extending away from the support surface, the first side guard being configured to prevent the mobile device from sliding laterally off the support surface;
   a second side guard extending away from the support surface and located opposite the first side guard, the second side guard being configured to prevent the mobile device from sliding laterally off the support surface; and
   a bottom guard extending away from the support surface, the bottom guard being configured to prevent the mobile device from sliding vertically off the support surface.

18. The near field communication system of claim 8, wherein the housing includes a marking to indicate where a user should place or locate their mobile device on the outer surface of the housing.

* * * * *